US009605415B2

(12) United States Patent
Edara et al.

(10) Patent No.: US 9,605,415 B2
(45) Date of Patent: Mar. 28, 2017

(54) SYSTEM AND METHOD FOR MONITORING A MACHINE (71) Applicant: Caterpillar Inc., Peoria, IL (US)

(72) Inventors: Thandava K. Edara, Peoria, IL (US); Michael Taylor, Swissvale, PA (US); Mo Wei, Dunlap, IL (US); Troy K. Becicka, Sahuarita, AZ (US); Daniel Stanek, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 242 days.

(21) Appl. No.: 14/484,694

(22) Filed: Sep. 12, 2014

(65) Prior Publication Data
US 2016/0076226 A1 Mar. 17, 2016

(51) Int. Cl.
| E02F 9/00 | (2006.01) |
| G07C 5/00 | (2006.01) |
| E02F 9/26 | (2006.01) |
| G01M 99/00 | (2011.01) |
| B60Q 9/00 | (2006.01) |
| G07C 5/08 | (2006.01) |
| E02F 9/20 | (2006.01) |

(52) U.S. Cl.
CPC ............... *E02F 9/267* (2013.01); *B60Q 9/00* (2013.01); *E02F 9/205* (2013.01); *E02F 9/2054* (2013.01); *G01M 99/005* (2013.01); *G07C 5/0808* (2013.01); *G07C 5/0816* (2013.01); *G07C 5/0841* (2013.01)

(58) Field of Classification Search
CPC combination set(s) only.
See application file for complete search history.

(56) References Cited

U.S. PATENT DOCUMENTS

| 5,469,356 | A | 11/1995 | Hawkins et al. |
| 5,551,524 | A | 9/1996 | Yamamoto et al. |
| 5,864,970 | A | 2/1999 | Maddock et al. |
| 5,987,379 | A | 11/1999 | Smith |
| 6,167,336 | A | 12/2000 | Singh et al. |
| 6,246,932 | B1 * | 6/2001 | Kageyama ........... G05D 1/0297 340/992 |
| 6,445,310 | B1 | 9/2002 | Bateman et al. |
| 6,493,612 | B1 | 12/2002 | Bisset et al. |
| 6,539,294 | B1 * | 3/2003 | Kageyama .............. E02F 3/842 180/168 |
| 6,633,800 | B1 | 10/2003 | Ward et al. |

(Continued)

FOREIGN PATENT DOCUMENTS

JP 2000-137522 A 5/2000

*Primary Examiner* — Yonel Beaulieu
(74) *Attorney, Agent, or Firm* — Leydig, Voit & Mayer, Ltd.

(57) ABSTRACT

A system for monitoring a machine at a work site includes a prime mover, a ground-engaging drive mechanism to propel the machine, and a plurality of sensors. A controller generates propulsion commands to propel the machine about the work site in an autonomous or semi-autonomous manner and determines a plurality of performance characteristics of the machine. The controller further determines whether the plurality of performance characteristics meet a plurality of performance thresholds and generates an alert command if any of the plurality of performance characteristics do not meet the plurality of performance thresholds.

20 Claims, 3 Drawing Sheets

(56) References Cited

U.S. PATENT DOCUMENTS

| | | |
|---|---|---|
| 6,845,311 B1 | 1/2005 | Stratton et al. |
| 6,984,952 B2 | 1/2006 | Peless et al. |
| 7,216,033 B2 | 5/2007 | Flann et al. |
| 7,302,837 B2 * | 12/2007 | Wendte ............... B60C 23/002 340/442 |
| 7,522,066 B2 | 4/2009 | Galera et al. |
| 7,578,079 B2 | 8/2009 | Furem |
| 7,734,397 B2 | 6/2010 | Peterson et al. |
| 7,734,398 B2 | 6/2010 | Manneppalli |
| 7,881,497 B2 | 2/2011 | Ganguli et al. |
| 7,979,175 B2 | 7/2011 | Allard et al. |
| 8,073,584 B2 | 12/2011 | Marty et al. |
| 8,139,108 B2 | 3/2012 | Stratton et al. |
| 8,301,318 B2 | 10/2012 | Lacaze et al. |
| 8,351,684 B2 | 1/2013 | Clar et al. |
| 8,456,327 B2 | 6/2013 | Bechtel et al. |
| 8,620,535 B2 | 12/2013 | Friend et al. |
| 8,655,505 B2 | 2/2014 | Sprock et al. |
| 2002/0195275 A1 | 12/2002 | Brand et al. |
| 2006/0136101 A1 | 6/2006 | Spengler |
| 2006/0271263 A1 | 11/2006 | Self et al. |
| 2007/0129869 A1 | 6/2007 | Gudat et al. |
| 2008/0180523 A1 | 7/2008 | Stratton et al. |
| 2008/0234878 A1 | 9/2008 | Joao |
| 2009/0043462 A1 | 2/2009 | Stratton et al. |
| 2009/0202109 A1 | 8/2009 | Clar et al. |
| 2010/0250023 A1 | 9/2010 | Gudat |
| 2011/0093171 A1 | 4/2011 | Saposnik |
| 2012/0089293 A1 | 4/2012 | Halder et al. |
| 2012/0136508 A1 | 5/2012 | Taylor et al. |
| 2012/0139325 A1 | 6/2012 | Norberg et al. |
| 2012/0154572 A1 | 6/2012 | Stratton et al. |
| 2012/0215378 A1 | 8/2012 | Sprock et al. |
| 2012/0283905 A1 | 11/2012 | Nakano et al. |
| 2013/0054078 A1 * | 2/2013 | Anderson ............ B60C 23/002 701/29.1 |
| 2014/0012404 A1 | 1/2014 | Taylor et al. |
| 2014/0032030 A1 | 1/2014 | Stratton et al. |
| 2014/0032058 A1 | 1/2014 | Stratton et al. |
| 2014/0032132 A1 | 1/2014 | Stratton et al. |
| 2014/0222247 A1 | 8/2014 | Friend et al. |

* cited by examiner

SYSTEM AND METHOD FOR MONITORING A MACHINE

TECHNICAL FIELD

This disclosure relates generally to monitoring a machine and, more particularly, to a system and method for generating alert commands if the productivity of the machine does not meet a desired threshold.

BACKGROUND

Machines such as dozers, motor graders, wheel loaders, etc., are used to perform a variety of tasks. For example, these machines may be used to move material and otherwise alter a work surface at a work site. The machines may operate in an autonomous, semi-autonomous, or manual manner to perform these tasks as part of a work plan. The machines may receive instructions in accordance with the work plan to perform operations including digging, loosening, carrying, etc., different materials at the work site.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

An operator may be responsible for monitoring the operation of a plurality of autonomous or semi-autonomous machines at the work site. The operator may be responsible for operating the machines in a manual mode (e.g., by remote control) at certain areas of the work site, if a machine becomes stuck, or is operating in an inefficient manner.

Movements of the machines and their associated work implements are often developed by a planning system or module. A plurality of variables may affect the planning system and impact the efficiency of the machine operation. It is often desirable to ensure that the machines perform the material movement operations such that the materials are moved in an efficient manner. In some instances, it may be difficult to determine whether a machine is operating in an efficient manner. In addition, it may also be desirable to quickly notify an operator if a machine's performance is significantly degraded or it becomes stuck.

U.S. Pat. No. 8,655,505 discloses a work site management system for use with a plurality of machines. The system may monitor the operation of the machines and generate reports of the performance of the machines. Such reports may include performance irregularities as well as anticipated irregularities. A controller may reconfigure operational relationships to positively affect the performance irregularities.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for monitoring a machine at a work site includes a prime mover, a ground-engaging drive mechanism operatively connected to the prime mover to propel the machine about the work site, a plurality of sensors associated with the machine for generating signals indicative of operating conditions of the machine, and a controller. The controller is configured to store a plurality of performance thresholds of the machine, generate propulsion commands to propel the machine about the work site in an autonomous or semi-autonomous manner, and receive a plurality of signals from the plurality of sensors. The controller is further configured to determine a plurality of performance characteristics of the machine based upon the plurality of signals, determine whether the plurality of performance characteristics meet the plurality of performance thresholds, and generate an alert command if any of the plurality of performance characteristics do not meet the plurality of performance thresholds.

In another aspect, a controller implemented method of monitoring a machine at a work site includes storing a plurality of performance thresholds of the machine, generating propulsion commands to propel the machine about the work site in an autonomous or semi-autonomous manner, and receiving a plurality of signals from a plurality of sensors associated with the machine. The method further includes determining a plurality of performance characteristics of the machine based upon the plurality of signals, determining whether the plurality of performance characteristics meet the plurality of performance thresholds, and generating an alert command if any of the plurality of performance characteristics do not meet the plurality of performance thresholds.

In still another aspect, a machine includes a prime mover, a ground-engaging work implement for engaging a work surface at a work site, a ground-engaging drive mechanism operatively connected to the prime mover to propel the machine about the work site, and a plurality of sensors associated with the machine for generating signals indicative of operating conditions of the machine. A controller is configured to store a plurality of performance thresholds of the machine, generate propulsion commands to propel the machine about the work site in an autonomous or semi-autonomous manner, and receive a plurality of signals from the plurality of sensors. The controller is further configured to determine a plurality of performance characteristics of the machine based upon the plurality of signals, determine whether the plurality of performance characteristics meet the plurality of performance thresholds, and generate an alert command if any of the plurality of performance characteristics do not meet the plurality of performance thresholds.

DETAILED DESCRIPTION

Figure 1:
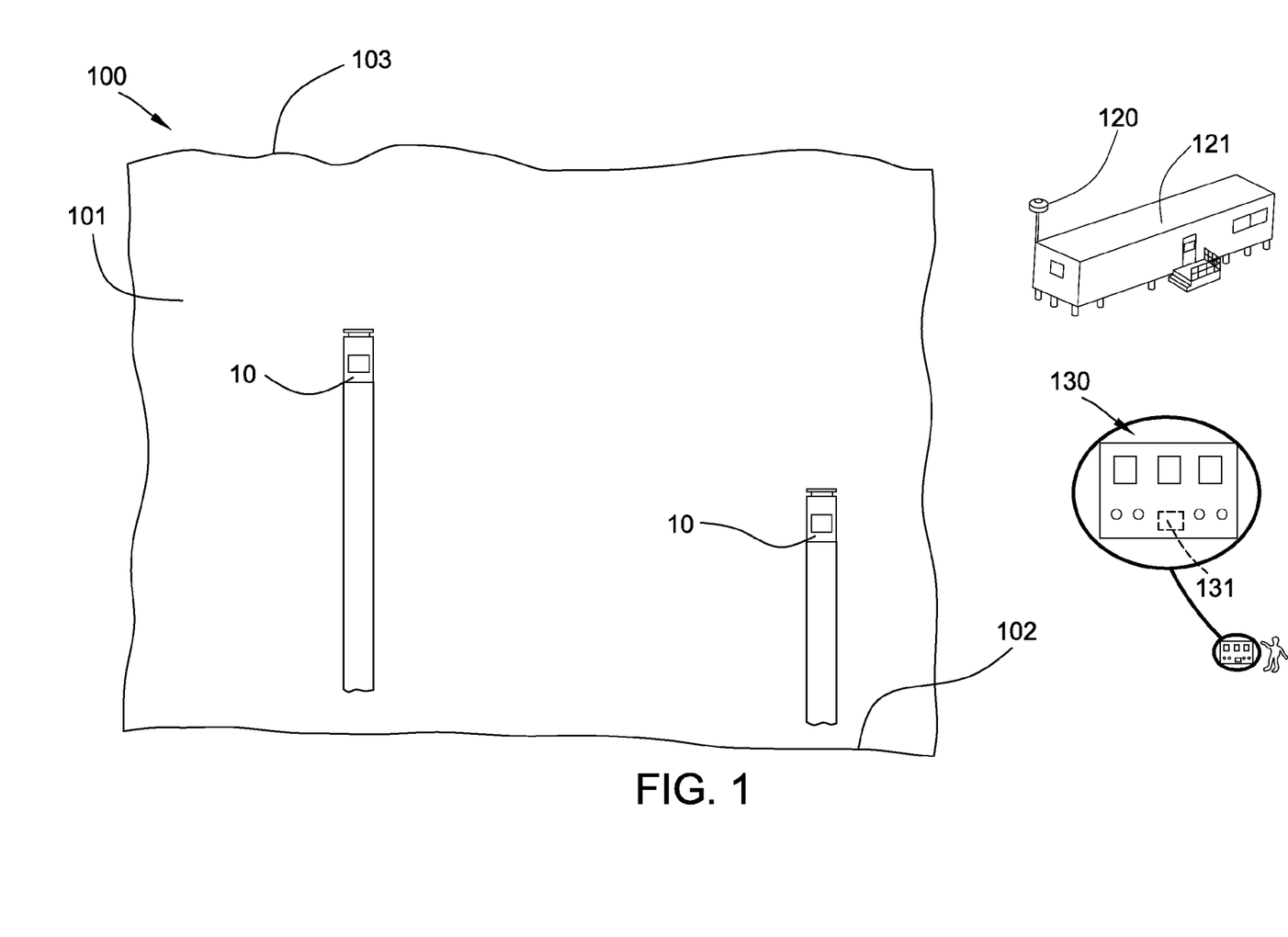
FIG. 1 depicts a schematic view of a work site at which a machine incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, or any other area in which movement of material is desired. Tasks associated with moving material may include a dozing operation, a grading operation, a leveling operation, a bulk material removal operation, or any other type of operation that results in the alteration of the existing topography at work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103. The work surface 104 of the work area 101 may take any form and refers to the actual profile or position of the terrain of the work area.

Machine 10 may be configured to move material at the work site 100 according to one or more material movement plans from an initial location such as near the high wall 102 to a spread or dump location such as at crest 103. The material movement plans may include, among other things, forming a plurality of spaced apart channels or slots 110 that are cut into the work surface 104 at work site 100 along a path 117 generally from the high wall 102 to the crest 103. In doing so, each machine 10 may move back and forth along a linear path generally between the high wall 102 and the crest 103.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a load truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
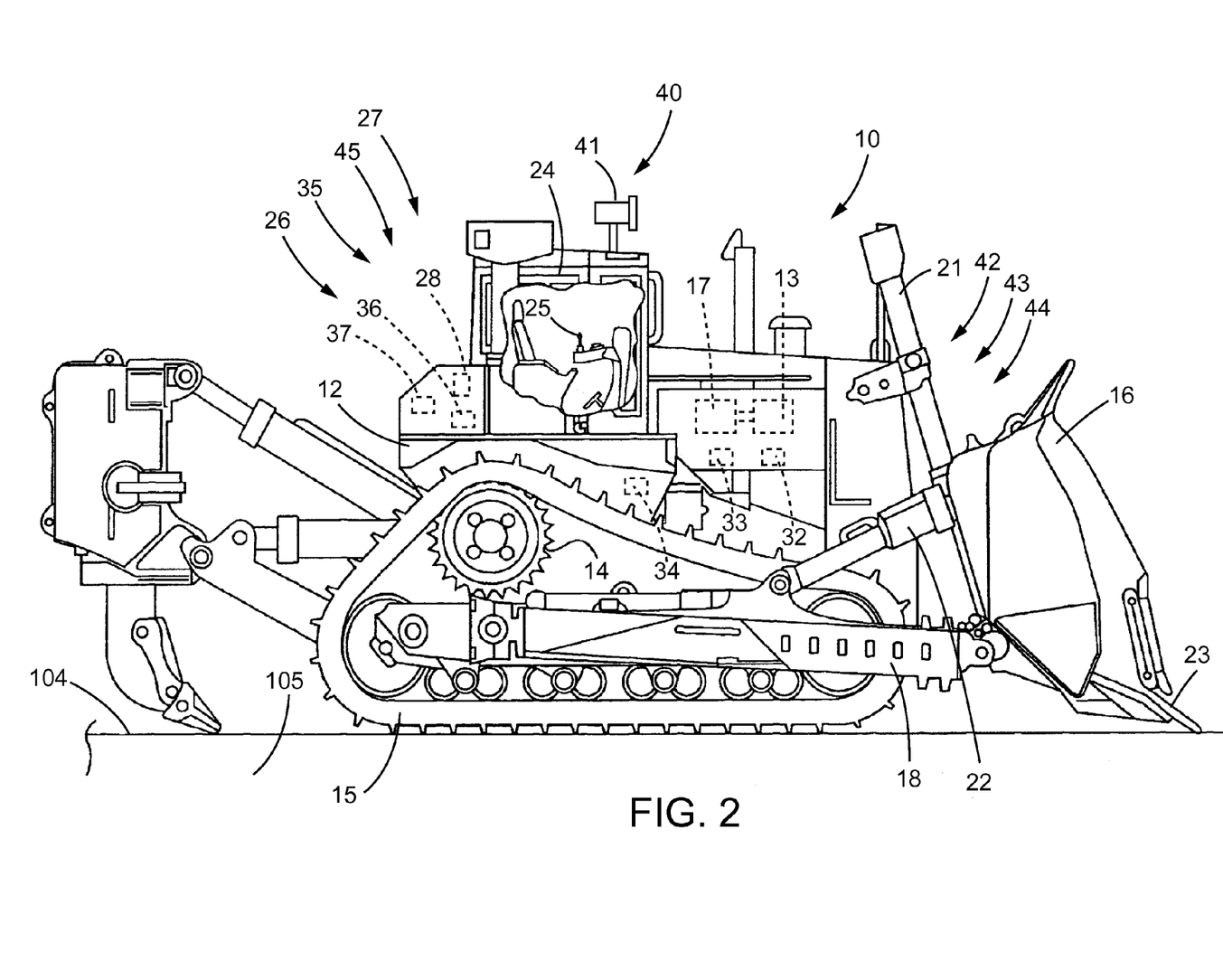
FIG. 2 depicts a diagrammatic illustration of a machine in accordance with the disclosure.

FIG. 2 depicts a diagrammatic illustration of a machine 10 such as a dozer with a ground-engaging work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Although machine 10 is shown in a "track-type" configuration, other configurations, such as a wheeled configuration, may be used. In one embodiment, machine 10 may be configured with a type of mechanical drive system so that engine 13 drives a torque converter 17 which in turn drives a transmission (not shown). Operation of the engine 13 and the transmission, which are operatively connected to the drive sprockets 14 and tracks 15, may be controlled by a control system 35 including a controller 36. The systems and methods of the disclosure may be used with any machine propulsion and drivetrain mechanisms applicable in the art for causing movement of the machine including hydrostatic, electric, or mechanical drives.

Blade 16 may be pivotally connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip 23 to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within cab 24 or off-board the machine through a wireless communications system 120 (FIG. 1). The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 121 (FIG. 1) or at a remote control unit 130. The functionality of control system 35 may be distributed so that certain functions are performed at machine 10 and other functions are performed remotely. In such case, the control system 35 may include a communications system such as wireless communications system 120 for transmitting signals between the machine 10 and a system located remote from the machine. In one embodiment, remote control unit 130 positioned remote from the machine 10 may provide some or all of the specific commands that are then transmitted by the wireless communications system 120 to systems of the machine.

Machine 10 may be configured to be operated autonomously, semi-autonomously, or manually. When operating semi-autonomously or manually, the machine 10 may be operated by remote control and/or by an operator physically located within the cab 24.

When operating the machine 10 via a remote control system, a portion of the control system 35 may be located at the remote control unit 130. Accordingly, machine 10 may include a machine controller 37 and remote control unit 130 may include a remote unit controller 131. The machine controller 37 and the remote unit controller 131 may be components of controller 36.

In one example, the remote control unit 130 (FIG. 1) may be configured with an instrument array and controls similar to that of the machine 10 with a plurality of gauges, displays, and input devices such as buttons, knobs, dials, levers, joysticks, and other controls (not shown). The remote control unit 130 may also include a point of view display 132 that includes one or more displays upon which visual images from a visual image system 40 may be displayed to depict a point of view relative to machine 10. The point of view display 132 may be used to display images depicting the front, the left side, and the right side of machine 10. If desired, additional images of other points of view may be displayed such as behind the machine 10 or views of other aspects of the machine such as the blade 16. Signals from the various sensors on the machine 10 may be transmitted directly or indirectly to the remote control unit 130 and displayed on the instrument array. If desired, the remote control unit 130 may be configured in a manner similar to the actual cab 24 of the machine 10.

When operating machine 10 by remote control, the machine 10 and the remote control unit 130 may communicate via the wireless communications system 120. Each of the machine 10 and the remote control unit 130 may include wireless communication devices to permit wireless transmission of a plurality of data signals between the machine and the remote control unit as well as permit communication with other systems remote from the machine and the remote control unit.

Machine 10 may be equipped with a plurality of machine sensors 26, as shown generally by an arrow in FIG. 2 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position and orientation of the machine 10 are sometimes collectively referred to as the position of the machine. The position sensor 28 may include a plurality of individual sensors that cooperate to generate and provide position signals to controller 36 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 36 may use position signals from the position sensors 28 to determine the position of the machine 10 within work site 100. In other examples, the position sensor 28 may include an odometer or another wheel rotation sensing sensor, a perception based system, or may use other systems such as lasers, sonar, or radar to determine all or some aspects of the position of machine 10.

In some embodiments, the position sensing system 27 may include a separate orientation sensing system. In other words, a position sensing system may be provided for determining the position of the machine 10 and a separate orientation sensing system may be provided for determining the orientation of the machine.

If desired, the position sensing system 27 may also be used to determine a ground speed of machine 10. Other sensors or a dedicated ground speed sensor may alternatively be used to determine the ground speed of the machine 10.

An engine speed sensor 32 may be operatively associated with engine 13 and utilized to generate a signal indicative of the speed or output of the engine 13. A torque converter speed sensor 33 may be operatively associated with torque converter 16 and utilized to monitor the output speed of the torque converter 17. During operation of the machine 10, the output speed of the engine 13, the output speed of the torque converter 17 together with the machine gear ratio may be used to determine the drawbar pull being generated.

A track speed sensor 34 may be operatively associated with the tracks 15 and utilized to determine, directly or indirectly, the speed of the tracks. If desired, a track speed sensor 34 may be associated with each track 15. In one embodiment, the track speed sensor 34 may embody a drive speed measurement sensor in the form of a magnetic sensor that measures the rate at which the drive sprocket 14 is rotated. The track speed of the tracks 15 together with ground speed of the machine 10 may be used to calculate the amount that the tracks 15 are slipping relative to the work surface 104.

The machine 10 may include a visual image system 40 such as a camera system for generating visual images indicative of a point of view relative to the machine 10. The visual image system 40 may include a plurality of visual image sensors such as cameras 41 for generating visual image signals. The visual image signals may be transmitted wirelessly to a system remote from machine 10. The plurality of cameras 41 of the visual image system 40 may be positioned to capture different views that an operator would have from within the cab 24 of machine 10. If desired, a plurality of cameras 41 may also be positioned to provide a point of view including the machine 10 and/or the blade 16 as well as a portion of the work site 100 at which the machine is operating. The visual image system 40 may be desirable in a plurality of instances including when operating the machine 10 remotely via a remote control unit 130 (FIG. 1), when the visibility of an operator within the cab 24 is limited, or when personnel remote from the machine desire to observe the operation of the machine such as when the machine is operating autonomously.

Although it may be generally desirable for the blade 16 to follow a target profile or path established by a planning system 45, performance characteristics of the machine 10 and/or desired operating efficiencies may cause a deviation from the target profile. More specifically, as blade 16 makes a cut, the load on the blade will increase. If the blade 16 is overloaded for a particular slope, the machine 10 may slip and/or cause excess wear on the machine. Accordingly, the control system 35 may include a blade control system 42 to maximize the efficiency of the material moving process.

In one embodiment, the blade control system 42 may control the load on the blade 16 so that the torque generated by the machine 10 is generally maintained at or about a predetermined value. In one example, it may be desirable to maintain the load on the machine 10 at approximately 80% of its maximum torque. In other examples, it may be desirable to maintain the load at a range of approximately 70-90% of the maximum torque. Other values and ranges are contemplated. In order to maintain the load at a desired value or within a desired range, the blade control system 42 may raise or lower the blade 16 to decrease or increase the amount of material carried by the blade 16 and thus decrease or increase the load. It should be noted that since the work surface 104 may be at different angles relative to a gravity reference, the load on the blade 16 corresponding to a particular load (e.g. 80% of the maximum machine load) will likely vary depending on the slope at which the machine 10 is operating.

The control system 35 may include an implement load monitoring system 43 shown generally by an arrow in FIG. 2. The implement load monitoring system 43 may include a variety of different types of implement load sensors (not shown) to measure the load on the blade 16. In one embodiment, the implement load sensor may embody one or more pressure sensors (not shown) for use with one or more hydraulic cylinder, such as second hydraulic cylinders 22, associated with blade 16. Signals from the pressure sensor indicative of the pressure within the second hydraulic cylinders 22 may be monitored by controller 36. The load on the blade 16 may be correlated to the load on the engine 13 by controller 36. Other manners of determining a change in cylinder pressure associated with a change in the load on blade 16 are contemplated, including other manners of measuring the pressure within second hydraulic cylinders 22 and measuring the pressure within other cylinders associated with the blade.

The load on the blade 16 may be affected by the slope of the terrain upon which the machine 10 is moving. Accordingly, if desired, the accuracy of the implement load measurement may be increased by utilizing the implement load sensor in conjunction with a slope or inclination sensor such as pitch angle sensor (not shown). For example, if the machine 10 is moving uphill, the load on the blade 16 may be higher due to gravity as compared to a machine operating in the same conditions on flat terrain. Similarly, the load on the blade 16 may be lower for the same conditions when operating the machine in a downhill orientation. By determining the slope of the terrain, the controller 36 may more accurately determine changes in the load on the blade 16.

If desired, a machine load monitoring system 44 may be included in control system 35. The machine load monitoring system 44 may utilize the engine speed sensor 32 and the torque converter speed sensor 33 to measure a difference between the speed of the engine 13 and the torque converter 17 to determine the load on the machine 10.

Control system 35 may also include a module or planning system 45 for determining or planning various aspects of the excavation plan. The planning system 45 may receive various types of input such as the configuration of the work surface 104, a final design plane, a desired loading profile, a desired carry profile, and characteristics of the material to be moved. Operating characteristics and capabilities of the machine 10 such as maximum load may also be entered into the planning system 45. The planning system 45 may simulate the results of cutting at a particular cut location and for a particular target profile, and then choose a cut location that creates the most desirable results based on one or more criteria.

Control system 35 may include a monitoring system 46 configured to monitor and manage the operation of a plurality of machines 10 autonomously or semi-autonomously at work site 100. In some configurations, operators may be responsible for the operation of groups of machines. In one example, an operator may be responsible for the operation of between two to five machines at a time. In addition to monitoring the operation of the machines 10, an operator may also be required for manually operating machines, such as by remote control, when the machines are in certain areas or performing certain operations. For example, an operator may be required to operate the machines 10 manually in areas in which personnel are present or in areas of relatively high danger such as near crest 103. Still further, an operator may be responsible for operating a machine 10 manually if its performance becomes significantly degraded or it becomes stuck.

The monitoring system 46 may be configured to monitor the operation of the machines 10 to ensure relatively continuous and efficient productivity. The monitoring system 46 may be configured to immediately notify an operator if one of the machines experiences degraded performance or becomes stuck, rather than waiting until the operator notices the change in performance.

Further, while an operator responsible for a plurality of machines 10 may notice when a machine is stopped or moving very slowly, the operator may not recognize when a machine is performing the desired operations at a less than ideal efficiency. For example, certain performance criteria may be established that should be maintained or achieved under most circumstances. An operator may be able to discern that a machine operation has slowed to twenty-five percent of a desired rate but may not be able to identify a machine moving at seventy-five percent of a desired rate. Still further, it may also be difficult for an operator to determine whether a machine is having difficulty following a material movement plan. Accordingly, the monitoring system 46 may also be configured to monitor the operation of the machines 10 and identify any machines that are not meeting a desired performance criteria.

The monitoring system 46 may include a plurality of application performance thresholds or criteria against which the performance characteristics of each machine may be compared to determine whether the machines 10 are operating efficiently and in accordance with material movement plans of the planning system 45. If any of the machines 10 are not operating as desired, the monitoring system 46 may notify the responsible operator that one of the machines is not meeting the desired performance criteria. In some instances, this may be due to the machine operating in an environment that is not well suited for autonomous machine operation. In other situations, the planning system 45 may not be able to respond to the topography or material conditions encountered by the machine 10. As a result, in some situations it may be desirable for the operator to assume manual control of the machine 10 to maneuver it to a new location or complete an operation manually.

Upon generating an alert command, the monitoring system 46 may also notify other personnel who may modify the material movement plans or the planning system 45 as desired. In some embodiments, the planning system 45 may be configured to use feedback from the monitoring system 46 to automatically adjust certain aspects of the material movement plans based upon such notification.

As described above, a plurality of sensors may be associated with each machine 10 for generating a plurality of signals indicative of the operating conditions of the machine. In some instances, the operating conditions may be directly indicative of the performance characteristics of the machine 10. For example, the position sensor 28 may provide a plurality of position signals that the controller 36 uses to determine the position of the machine 10. In other instances, the operating conditions may be used to derive the desired performance characteristics of the machine 10. For example, engine speed sensor 32 may be used in conjunction with torque converter speed sensor 33 to determine the drawbar pull of the machine 10. In another example, data from the track speed sensor 34 may be used together with the ground speed of the machine to determine the amount that the tracks 15 are slipping relative to the work surface 104.

After the controller 36 receives the signals from the sensors and determines the relevant operating conditions of each machine, the monitoring system 46 may evaluate the operating conditions of each machine 10 to determine a plurality of performance characteristics for each machine. The monitoring system 46 may further compare the plurality of performance characteristics to a plurality of application performance thresholds stored within controller 36. An alert command signal may be generated if any of the plurality of performance characteristics do not meet the plurality of performance thresholds of the machines.

One performance characteristic that may be evaluated by the monitoring system 46 is movement of the machine 10 over time. More specifically, the monitoring system 46 may track movement of the machine 10 to ensure that it continues to move a predetermined distance over a predetermined time period. In one example, the controller 36 may receive a plurality of position signals from the position sensor 28 and determine the position of the machine 10 as it moves about the work site 100. A performance threshold such as movement of a specified distance over a specified period of time may be stored within controller 36. The monitoring system 46 may compare the distance the machine 10 moves during the specified time period to the performance threshold to ensure that the machine's movement exceeds the threshold. If the machine 10 moves less than the performance threshold, an alert command may be generated by the controller 36 notifying the operator and/or other personnel.

The distance that a machine 10 must move along a predetermined distance over a specified time period may be set or stored within controller 36 as a distance performance threshold. The distance performance threshold may be fixed for use throughout the work site 100 or may vary as described in more detail below.

Another performance characteristic that may be evaluated by the monitoring system 46 is the amount of slip of the ground-engaging drive mechanism such as tracks 15 relative to the work surface 104. A first operating condition of the machine 10 that may be monitored by controller 36 is the speed of the tracks 15. A second operating condition that may be monitored is the ground speed of the machine 10. By comparing the speed of the tracks 15 to the actual ground speed of the machine 10, the amount of slip of the tracks may be determined.

The amount of track slip may be set as a track slip performance threshold and set or stored within controller 36. As with the distance performance threshold, the track slip performance threshold may be fixed for use throughout the work site 100 or may vary as described in more detail below.

In one example, the track slip performance threshold may be set at seventy-five percent over a five second time period. Based upon this threshold, if the tracks 15 slip more than seventy-five percent for more than five seconds, the monitoring system 46 may generate an alert command as described above.

Although described in the context of tracks 15 and track slip, it should be noted that the monitoring system 46 may monitor any type of propulsion slip regardless of whether the machine 10 is propelled by tracks 15 or other ground-engaging propulsion devices such as wheels.

Still another performance characteristic that may be evaluated by the monitoring system 46 is whether each machine 10 is reaching waypoints or specified locations along path 117 at the work site 100. More specifically, when the planning system 45 establishes a path 117 for a machine 10, it may break the path into a series or plurality of waypoints such as locations separated by predetermined intervals. The predetermined intervals may be based upon a specified distance or specified time. Once the locations of the plurality of waypoints along the path 117 are determined, the plurality of waypoints may be stored within controller 36.

The monitoring system 46 may be configured to determine whether a machine 10 has reached a waypoint within a specified interval of the expected arrival time. To do so, the monitoring system 46 may determine the position of the machine 10 based upon signals from the position sensor 28 and determine when the machine should reach the next waypoint. If the machine 10 fails to reach the next waypoint within the performance threshold, the monitoring system 46 may generate an alert command as described above.

In one example, the waypoint performance threshold may be set or stored within the controller as three seconds so that an alert signal will be generated if the machine does not reached a waypoint within three seconds of its expected arrival time. As with the distance and track slip performance thresholds, the waypoint performance threshold may be fixed for use throughout work site 100. In other instances, the waypoint performance threshold as well as the distance and track slip performance thresholds may be dependent upon various factors such as the position of the machine 10 at the work site 100, the characteristics of the material 105 being moved, and/or the operation being performed. For example, the distance and waypoint performance thresholds may be modified in areas in which the planning system 45 is configured to operate the machine more slowly (e.g., in relatively dangerous areas such as those at which personnel are present or near crest 103). In addition, the characteristics of the material 105 may also affect the performance threshold. For example, the machine may be expected to move more slowly on material 105 that is relatively soft and move more quickly along material that is relatively hard. Still further, the operation being performed by the machine 10 may also affect the performance threshold. For example, a machine may move more slowly and experience more slip when performing a cutting operation as compared to a carry operation.

An additional performance characteristic that may be evaluated by the monitoring system 46 is the efficiency of the machine in performing desired operations such as moving material 105. To the extent that the blade 16 is above the path set or determined by the planning system 45, the machine will be under digging and thus moving less material 105 than is desired. In such case, the machine 10 will be moving about the work site but performing less work than which the machine is capable. As such, the performance threshold is the extent to which the work implement is under digging.

The actual path that the blade 16 follows may be determined directly or indirectly. To determine the path directly, a position sensor (not shown) may be mounted directly on the blade. In another example, position sensors (not shown) associated with the first hydraulic cylinder 21 and the second hydraulic cylinders 22 may be used to determine the relative position of the blade 16, the position sensor 28 may be used to determine the position of the machine, and the positions combined to determine the path of the blade. To determine the path indirectly, the controller 36 may determine the position of the machine 10 based upon position sensor 28 and determine the position of work surface 104 based upon the position of the machine and its known dimension. The monitoring system 46 may rely on the position of the work surface 104 as an approximation of the path that the blade 16 followed.

Regardless of the manner in which the actual path of the blade 16 is determined, the monitoring system 46 may compare the desired position of the blade to its actual position to determine how closely the blade is following the path set by the planning system 45. The desired position of the blade 16 may be set by the planning system 45 in view of a plurality of factors including capabilities of the machine 10, the topography and characteristics of the work surface 104, and the expected load on the blade or the machine.

The actual path may vary from the planned or desired path due to the actual operating conditions varying from those that were expected as well as the manner in which other machine system respond based upon input from the implement load monitoring system 43 and the machine load monitoring system 44. The monitoring system 46 may compare the difference between the desired position and the actual position to the efficiency performance threshold set or stored within controller 36.

In one example, the efficiency performance threshold may be set at eighty percent and an alert command generated if the machine 10 is operating at less than eighty percent efficiency for a predetermined time period or distance. In other words, if the machine 10 is under digging by more than twenty percent, the machine will not be meeting the efficiency performance threshold. In some instances, the under digging may be apparent to an operator and other personnel but in other instances it may not. Further, it may be especially challenging for an operator to discern such under digging when responsible for monitoring and operating by remote control a plurality of machines 10. In such case, a comparison of the path of the blade 16 to the material movement plan will reveal that the machine 10 is actually moving less material than desired.

If the machine 10 operates below the desired efficiency for a predetermined period of time, the monitoring system 46 may generate an alert command that may be used to modify material movement plans and the electronic map of the work site 100. Such modification may be made by the operator, other personnel and/or by the planning system 45 directly. In some instances, it may be desirable for the operator to operate the machine 10 manually (e.g., by remote control) in the relevant area to increase the efficiency of machine operation.

A further performance characteristic that may be evaluated by the monitoring system 46 is whether the machine is over digging rather than following the path determined by the planning system 45. To the extent that the blade is below the path determined by the planning system 45, the machine may be operating more slowly than desired and in a relatively inconsistent manner as systems on the machine attempt to compensate for such over digging. In addition, the relatively inconsistent operation of the machine 10 may also create more wear on the machine as aspects of the machine are loaded and unloaded during operation.

As with under digging, the over digging performance threshold may be set or stored within controller 36 and used by the monitoring system 45 when comparing the desired position of blade 16 to its actual position. In one example, the over digging performance threshold may be set at twenty percent and an alert command generated if the machine 10 is over digging by more than twenty percent efficiency for a predetermined time period or distance. In other words, if the machine 10 is over digging by more than twenty percent, the machine will not be meeting the performance threshold.

The analysis of whether the machine 10 is over digging and how the planning system 45 and the monitoring system 46 may respond is substantially similar to that described above with respect to under digging. As such, the performance threshold operates to determine the extent to which the work implement is over digging. However, in some instances, the analysis and manner in which the planning system 45 and monitoring system 46 respond to over digging may be different from under digging and therefore they are identified separately herein.

In one embodiment, the monitoring system 46 may be configured with each performance threshold operative throughout the entire work site 100 or within certain areas of the work site. The monitoring system 46 may, however, adjust or modify the performance thresholds if the machine is operating in areas in which changes in performance would be expected. For example, machine 10 may be instructed to move more slowly in relatively dangerous areas or may move more slowly in certain areas due to the topography or material characteristics of the work surface 104, or due to the operation being performed by the machine. In such case, the monitoring system 46 may compare the performance characteristics to a modified performance threshold before generating an alert command and only generating the alert command if the performance characteristics do not meet the performance thresholds.

In an alternate embodiment, the monitoring system 46 may include different performance thresholds for each performance characteristic depending upon any of a plurality of factors including the location at the work site 100, the topography and material characteristics of the work surface 104, and/or the operation being performed by the machine 10. The monitoring system 46 may determine the relevant performance threshold for each performance characteristic based upon the relevant factors and then compare the relevant performance threshold to the performance characteristic as determined by the operating conditions of the machine 10.

Regardless of whether the monitoring system 46 uses a plurality of stored performance thresholds or modifies the performance thresholds depending on the topography, material characteristics, and/or type of operation, each of these factors may impact whether an alert command is generated. As an example, the controller 36 may be configured to store an electronic map of the work site 100 that includes not only the topography but also material characteristics at different locations of the work site. In such case, whether an alert command is generated may be dependent upon the topography and/or the material characteristics at which the machine is operating as well as the operation being performed.

Figure 3:
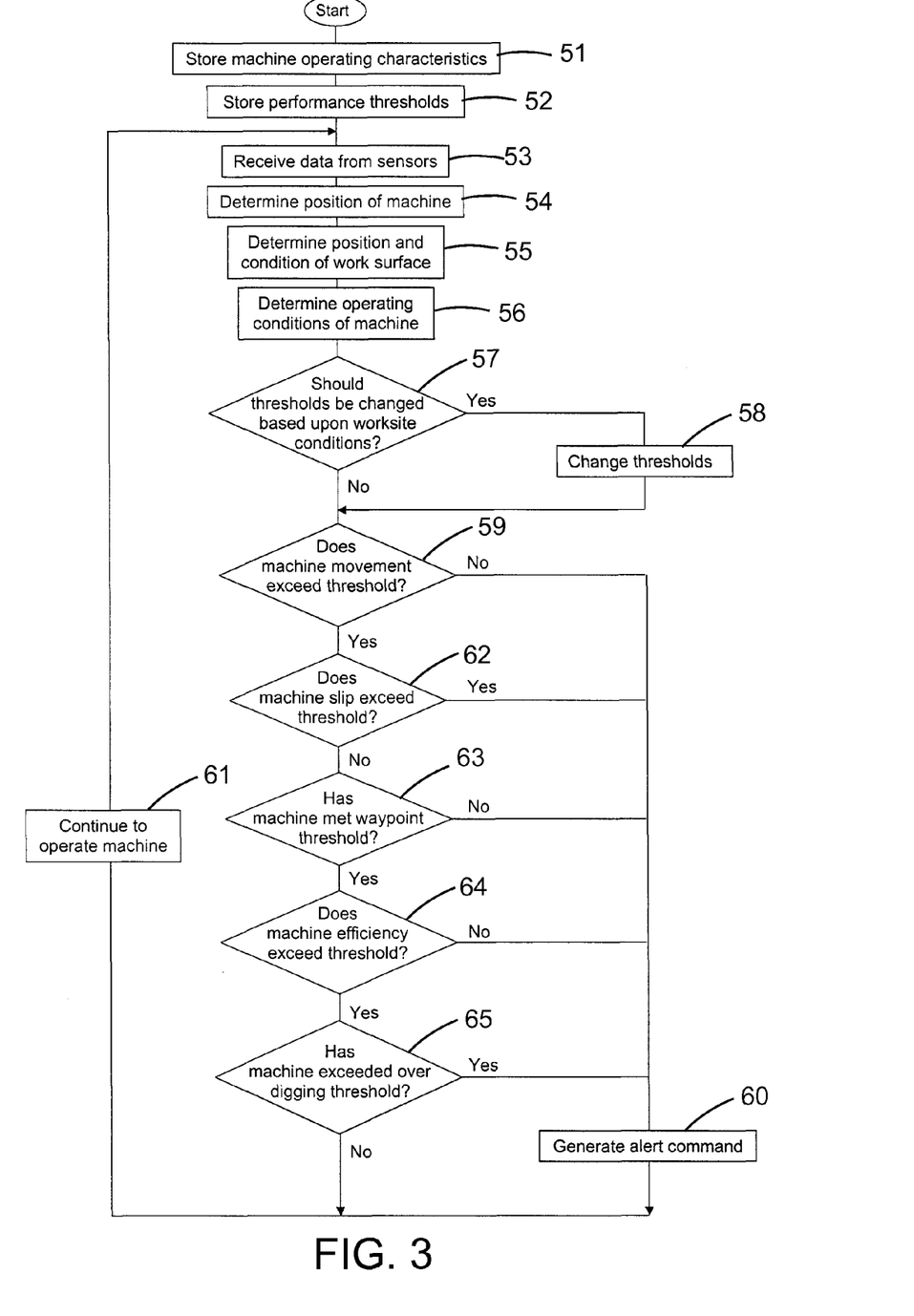
FIG. 3 depicts a flowchart illustrating a machine monitoring process in accordance with the disclosure.

The flowchart in FIG. 3 depicts a process in which the monitoring system 46 may generate an alert command signal if any of the plurality of performance characteristics of a machine do not meet the plurality of performance thresholds. Although the monitoring system 46 is configured to monitor a plurality of machines 10, the flowchart depicts monitoring of only one machine as the monitoring process for each machine is identical. The monitoring system 46 may be configured to prioritize the alert commands in case an operator receives alert commands for more than one machine at a time. In doing so, a priority with respect to each performance threshold may be set or stored within controller 36. Alert commands generated by the monitoring system may identify the priority of the performance threshold that has not been met and may further direct the operator's attention to the machines in order of priority.

At stage 51, operating characteristics of machine 10 may be entered into controller 36. The operating characteristics may include a desired maximum load on the machine 10 and the dimensions of the machine including those of blade 16. At stage 52, the performance thresholds may be set or stored within controller 36. These thresholds may include the distance threshold, the track slip threshold, the waypoint threshold, the efficiency threshold, and the over digging threshold. Each of these thresholds may be set or stored by an operator, management personnel, other personnel, or may be preset as a default within the monitoring system 46.

At stage 53, the controller 36 may receive data in the form of signals from various sensors associated with the machine 10. The controller 36 may use position signals received from the position sensor 28 to determine at stage 54 the position of machine 10. The controller 36 may also use at stage 55 the position of machine 10 to update the topography of the work site 100 and the material characteristics stored within the electronic map.

At stage 56, the controller 36 may use a plurality of signals from a plurality of sensors associated with the machine 10 to determine various operating conditions of the machine 10. For example, the controller 36 may determine the speed at which the machine 10 is moving (i.e., the ground speed of the machine 10), the speed of the tracks 15, and the position of blade 16.

The monitoring system 46 may determine at decision stage 57 whether the performance thresholds should be adjusted or changed based upon the topography or characteristics of the work surface 104 upon which the machine 10 is operating and the operation being performed. If a change is desired, the monitoring system 46 may adjust or change the performance characteristics at stage 58 to reflect the conditions of the work surface 104 or the task being performed by the machine 10.

At decision stage 59, the monitoring system 46 may compare the amount of movement of the machine 10 to the movement performance threshold. The monitoring system 46 may do so by comparing the current position of the machine 10 to its former position at a time equal to that specified in the movement performance threshold to determine whether the distance between the former position and the current position exceeds that specified in the movement performance threshold. In another example, the monitoring system 46 may determine that the machine 10 has exceeded the movement performance threshold if the speed of the machine has remained above the movement performance threshold for the time period specified in the movement performance threshold.

If the movement of the machine 10 does not exceed the movement performance threshold, an alert command may be generated at stage 60 notifying the operator, other personnel, and the planning system 45. The machine 10 may continue to be operated either autonomously or manually by the operator at stage 61 as desired.

If the movement of machine 10 exceeds the movement performance threshold at decision stage 59, the monitoring system 46 may determine at decision stage 62 whether the slip of the track 15 exceeds the track slip performance threshold. The monitoring system 46 may do so by determining the track slip by comparing the speed of the track 15 to the ground speed of the machine 10. If the track slip exceeds the track slip performance threshold, the monitoring system 46 may generate an alert command at stage 60. The machine 10 may continue to be operated either autonomously or manually by the operator at stage 61 as desired.

If the track slip is less than the track slip performance threshold at decision stage 62, the monitoring system may determine at decision stage 63 whether the machine 10 has met the waypoint performance threshold. The monitoring system 46 may do so by determining when the machine 10 should have reached the next waypoint and comparing it to the waypoint performance threshold. If the machine 10 has not reached the next waypoint within the waypoint slip performance threshold, the monitoring system 46 may generate an alert command at stage 60. The machine 10 may continue to be operated either autonomously or manually by the operator at stage 61 as desired.

If the machine 10 has met the waypoint performance threshold, the monitoring system may determine at decision stage 64 whether the machine 10 has met the efficiency performance threshold. The monitoring system 46 may do so by monitoring the position of blade 16 and comparing it to the desired blade position determined by the planning system 45. If the blade 16 is under cutting by more than the efficiency performance threshold for a predetermined time or distance, the monitoring system 46 may generate an alert command at stage 60. The machine 10 may continue to be operated either autonomously or manually by the operator at stage 61 as desired.

If the machine 10 has met the efficiency performance threshold, the monitoring system may determine at decision stage 65 whether the machine 10 has met the over digging performance threshold. The monitoring system 46 may do so by monitoring the position of blade 16 and comparing it to the desired blade position determined by the planning system 45. If the blade 16 is over digging by more than the over digging performance threshold for a predetermined time or distance, the monitoring system 46 may generate an alert command at stage 60. The machine 10 may continue to be operated either autonomously or manually by the operator at stage 61 as desired.

INDUSTRIAL APPLICABILITY

The industrial applicability of the system described herein will be readily appreciated from the forgoing discussion. The foregoing discussion is applicable to systems in which a plurality of machines 10 are operated autonomously or semi-autonomously at a work site 100. Such system may be used at a mining site, a landfill, a quarry, a construction site, a roadwork site, a forest, a farm, or any other area in which movement of machines is desired.

At some work sites 100, each operator may be responsible for the operation of a plurality of machines. The operators may be responsible for generally monitoring the operation of the machines 10 and also manually operating the machines, such as by remote control, when the machines are in certain areas or performing certain operations.

A monitoring system 46 may be provided to monitor the operation of the machines 10 to ensure relatively continuous and efficient productivity. The monitoring system 46 may include a plurality of performance thresholds against which the performance characteristics of each machine may be compared to determine whether the machines 10 are operating efficiently and in accordance with desired material movement plans. If any of the machines 10 are not operating as desired, the monitoring system 46 may generate an alert command to immediately notifying an operator. In addition, the monitoring system may notify other personnel and/or provide additional information to the planning system 45 to compensate or make adjustments based upon the reduced productivity.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for operating a machine at a work site, comprising;
a prime mover;
a ground-engaging drive mechanism operatively connected to the prime mover to propel the machine about the work site;
a plurality of sensors associated with the machine for generating signals indicative of operating conditions of the machine; and
a controller configured to:
store a plurality of performance thresholds of the machine;
establish a path for the machine;
autonomously generate propulsion commands to propel the machine along the path in an autonomous or semi-autonomous manner;
receive a plurality of signals from the plurality of sensors;
determine a plurality of performance characteristics of the machine based upon the plurality of signals;
determine whether the plurality of performance characteristics meet the plurality of performance thresholds;
generate an alert command if any of the plurality of performance characteristics do not meet the plurality of performance thresholds; and
terminate the autonomous generation of propulsion commands to propel the machine along the path in an autonomous or semi-autonomous manner upon receipt of instructions from an operator to operate the machine manually.

2. The system of claim 1, wherein one of the plurality of performance thresholds is movement of the machine along a predetermined distance over a predetermined time period.

3. The system of claim 1, wherein one of the plurality of performance thresholds is slip of the ground-engaging drive mechanism over a predetermined time period.

4. The system of claim 1, wherein the controller is configured to divide the path into a plurality of waypoints and one of the plurality of performance thresholds is whether the machine has reached one of the waypoints within a predetermined time period.

5. The system of claim 1, wherein one of the plurality of performance thresholds is an efficiency of machine operation.

6. The system of claim 1, further comprising a ground-engaging work implement, and wherein the controller is configured to determine a desired path of the ground-engaging work implement, determine an actual path of the ground-engaging work implement, determine an extent of under digging based upon a difference between the desired path and the actual path, and one of the plurality of performance thresholds is the extent of under digging.

7. The system of claim 1, further comprising a ground-engaging work implement, and wherein the controller is configured to determine a desired path of the ground-engaging work implement, determine an actual path of the ground-engaging work implement, and determine an extent of over digging based a difference between the desired path and the actual path, and one of the plurality of performance thresholds is the extent of over digging.

8. The system of claim 1, wherein one of the plurality of sensors is a position sensor associated with the machine for generating position signals indicative of a position of the machine at the work site.

9. The system of claim 1, wherein the controller is configured to store an electronic map of the work site including a topography of the work site and whether the alert command is generated is dependent upon the topography at which the machine is operating.

10. The system of claim 1, wherein the controller is configured to store an electronic map of the work site including material characteristics of the work site and whether the alert command is generated is dependent upon the material characteristics at which the machine is operating.

11. The system of claim 1, wherein the controller is further configured to operate a plurality of machines, each machine including:
a machine controller configured to:
store a plurality of performance thresholds of the machine;
establish a path for the machine;
autonomously generate propulsion commands to propel the machine along the path in an autonomous or semi-autonomous manner;
receive a plurality of signals from a plurality of sensors;
determine a plurality of performance characteristics of the machine based upon the plurality of signals;

determine whether the plurality of performance characteristics meet the plurality of performance thresholds; and generate an alert command if any of the plurality of performance characteristics do not meet the plurality of performance thresholds.

12. The system of claim 11, wherein the alert command identifies the machine that does not meet the plurality of performance thresholds.

13. The system of claim 1, wherein the machine controller is further configured to store a priority with respect to each performance threshold and the alert command includes the priority of a performance threshold that has not been met.

14. A method of operating a machine at a work site, comprising:
storing, by a controller, a plurality of performance thresholds of the machine;
establishing, by the controller, a path for the machine;
generating, by the controller, autonomous propulsion commands to propel the machine along the path in an autonomous or semi-autonomous manner;
receiving, within the controller, a plurality of signals from a plurality of sensors associated with the machine;
determining, with the controller, a plurality of performance characteristics of the machine based upon the plurality of signals;
determining, within the controller, whether the plurality of performance characteristics meet the plurality of performance thresholds;
generating, by the controller, an alert command if any of the plurality of performance characteristics do not meet the plurality of performance thresholds;
terminating, by the controller, the generation of the autonomous propulsion commands to propel the machine along the path in an autonomous or semi-autonomous manner; and
generating, manual propulsion commands to propel the machine in a manual manner.

15. The method of claim 14, wherein one of the plurality of performance thresholds is movement of the machine along a predetermined distance over a predetermined time period.

16. The method of claim 14, further including dividing the path into a plurality of waypoints and wherein one of the plurality of performance thresholds is whether the machine has reached one the waypoints within a predetermined time period.

17. The method of claim 14, wherein one of the plurality of performance thresholds is an efficiency of machine operation.

18. The method of claim 14, wherein one of the plurality of performance thresholds is an extent to which a work implement is over digging.

19. A machine comprising:
a prime mover;
a ground-engaging work implement for moving material at a work site;
a ground-engaging drive mechanism operatively connected to the prime mover to propel the machine about the work site;
a plurality of sensors associated with the machine for generating signals indicative of operating conditions of the machine; and
a controller configured to:
store a plurality of performance thresholds of the machine;
establish a path for the machine;
autonomously generate propulsion commands to propel the machine along the path in an autonomous or semi-autonomous manner;
receive a plurality of signals from the plurality of sensors;
determine a plurality of performance characteristics of the machine based upon the plurality of signals;
determine whether the plurality of performance characteristics meet the plurality of performance thresholds;
generate an alert command if any of the plurality of performance characteristics do not meet the plurality of performance thresholds; and
terminate the autonomous generation of propulsion commands to propel the machine along the path in an autonomous or semi-autonomous manner upon receipt of instructions from an operator to operate the machine manually.

20. The method of claim 14, further including operating a plurality of machines at the work site, each machine being operated by:
storing, by a machine controller, a plurality of performance thresholds of the machine;
establishing, by the machine controller, a path for the machine;
generating, by the machine controller, autonomous propulsion commands to propel the machine about the work site in an autonomous or semi-autonomous manner;
receiving, within the machine controller, a plurality of signals from a plurality of sensors associated with the machine;
determining, within the machine controller, a plurality of performance characteristics of the machine based upon the plurality of signals;
determining, within the machine controller, whether the plurality of performance characteristics meet the plurality of performance thresholds; and
generating, by the controller, an alert command if any of the plurality of performance characteristics do not meet the plurality of performance thresholds; and
terminating, by the controller, the generation of the autonomous propulsion commands for only one of the machines to terminate propulsion of the only one of the machines about the work site in an autonomous or semi-autonomous manner; and
generating manual propulsion commands to propel the only one of the machines about the work site a manual manner.

* * * * *